Nov. 13, 1962
G. F. DINGER
3,063,185
ADAPTOR FOR CONNECTING A FISHING LINE TO
AND CONTROLLING A SIGNALLING DEVICE
Filed July 28, 1960
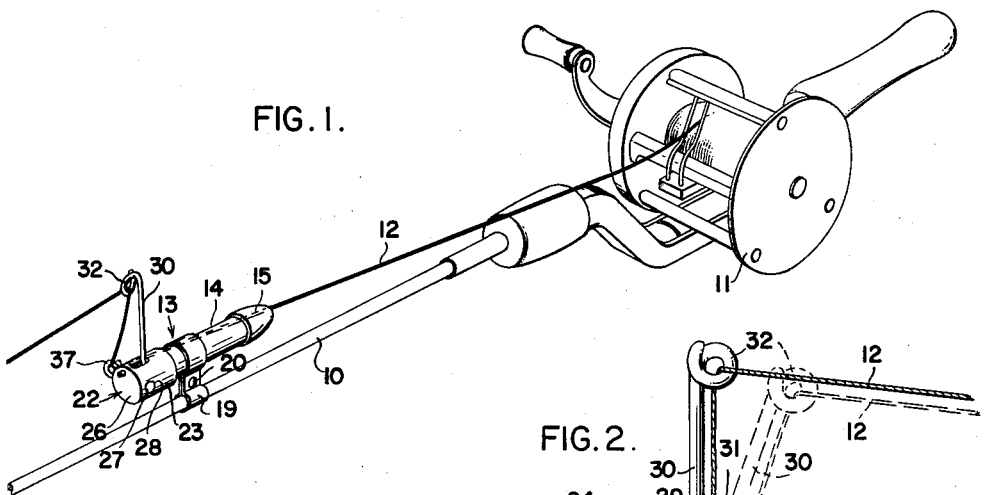
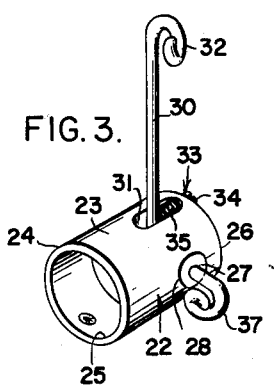
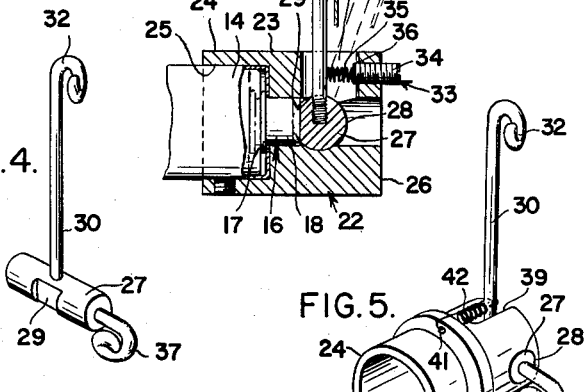
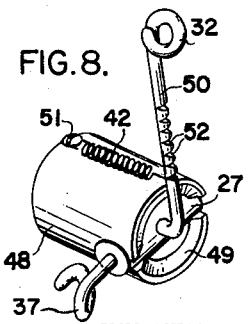
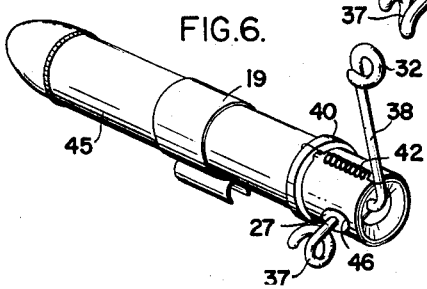
INVENTOR.
GEORGE F. DINGER
BY Warren F. B. Lindsley
ATTORNEY United States Patent Office 3,063,185
Patented Nov. 13, 1962

3,063,185
ADAPTOR FOR CONNECTING A FISHING LINE TO AND CONTROLLING A SIGNALLING DEVICE
George F. Dinger, 3612 S. 43rd St., Milwaukee 20, Wis.
Filed July 28, 1960, Ser. No. 45,969
1 Claim. (Cl. 43—17)

This invention relates to fishing tackle and more particularly to a line operated fishing signal.

Heretofore line operated fishing signals for use on a fishing rod have been provided, however, these structures usually involved bulky, relatively heavy, complicated mechanisms which comprised a part of a battery casing manufactured as a unitary device. A need exists for a simple device mountable, for example, on a fishing rod and used with commercially available battery casings with their built in switching mechanisms for providing the desired signalling structure.

In accordance with the invention claimed a new and improved circuit controlling device is provided for attachment to a fishing rod. This device may comprise a hollow housing arranged for receiving the switch end of a battery casing therein. A shaft is arranged to extend through the housing and is provided with a switch actuating portion between the ends thereof and within the hollow part of the housing. A lever arm is fixedly attached at one end thereof to the shaft and is arranged to extend transversely therefrom. The shaft is rotatable in one direction to actuate the switch portion and the switch of the battery casing. Means are further provided for biasing the lever arm against movement in the one direction to control the force necessary for switch actuation.

It is, therefore, one object of this invention to provide a new and improved line operated fish signalling device.

Another object of this invention is to provide a new and improved simple, compact adaptor for mounting on a fishing rod for triggering the switch of a battery casing to actuate a signal.

A further object of this invention is to provide a new and improved signalling device adapted to be mounted on a fishing rod and comprising a movable member engaged and actuated by the fishing line to energize the signal when a pull is exerted on the line by a fish.

A still further object of this invention is to provide a new and improved adaptor for utilization with commercially available switch actuated battery flash light casings to provide a signalling device triggered upon a predetermined movement of a fishing line.

A still further object of this invention is to provide a new and improved signalling device which can be readily detached from the battery casing for replacement of the battery casing and signal mechanism with a minimum of effort.

Objects and advantages other than those set forth will be apparent from the following description when read in connection with the accompanying drawing, in which:

FIG. 1 is a perspective view of a fishing rod showing an adaptor interconnecting a fishing line and a signalling device and embodying the invention;

FIG. 2 is an enlarged cross sectional view of the adaptor shown in FIG. 1 rotated 180 degrees;

FIG. 3 is an enlarged perspective view of the adaptor shown in FIG. 1 rotated 180 degrees;

FIG. 4 is an enlarged perspective view of the shaft and lever arm assembly of the adaptor shown in FIG. 1;

FIG. 5 is a perspective view of a modification of the adaptor shown in FIG. 1;

FIG. 6 is a perspective view of a further modification of the adaptor shown in FIG. 5 when formed as a unitary part of a signalling device;

FIG. 7 is a perspective view of a further modification of the structure shown in FIG. 5; and FIG. 8 is a perspective view of a modification of the structure shown in FIG. 7.

Referring more particularly to the drawing by characters of reference wherein the same reference characters are used for like parts in the several figures, FIG. 1 discloses a portion of a conventional fishing rod or pole 10 having a fishing reel 11 attached thereto. A fishing line 12 is connected to the reel at one end thereof and is wound therearound and extends therefrom through a signalling device 13 clamped to the pole 10. The pole, reel and line are of conventional construction and are shown merely to illustrate the application of the signalling device.

The signalling device 13 comprises a battery casing 14 which may be, for example, tubular in shape and is adapted to contain a battery cell or cells. At one end of the battery casing is arranged a signalling element which may be a small electric lamp (not shown) enclosed by a translucent cover member 15. The lamp is biased away from electrical contact with the battery by a spring (not shown). At the other end of casing 14 is a switch contact 16 which has an annular flange 17 arranged within the casing between the battery and the casing end and a substantially cylindrical portion 18 extending from the flange outwardly of casing 14 (shown more clearly in FIG. 2). Contact 16 is held in electrical contact with the battery in casing 14 by the spring arranged at the lamp end of the casing. Upon inward movement of contact 16 the lamp is brought into electrical contact with the battery. The parts of the signalling device and their operation are well known in the art and form one of the known flash light structures sold in the market place.

Casing 14 may be attached to the fishing pole in various ways but is shown as being fixedly attached to pole 10 by a resilient clip or clamp 19 which is adapted to embrace casing 14 and pole 10. A screw 20 is provided to firmly grip the parts of the clamp together in pole and casing encircling arrangement.

In accordance with the invention claimed a new and improved adaptor 22 is provided for connecting the signalling device 13 in working arrangement with the fishing line 12. Adaptor 22, as shown in FIGS. 1–4, comprises an elongated hollow cylindrical housing 23 arranged at end 24 for receiving the switch or contact end 25 of the tubular battery casing 14. At the other end 26 of housing 23, a shaft 27 is arranged to extend through the housing transversely to the housing's longitudinal axis. The ends of shaft 27 project into suitable bearing apertures 28 in the walls of housing 22 and are rotatably mounted therein. The center portion of shaft 27 is provided with a switch actuating means such as a cam-like engaging surface 29. As shown in FIG. 4 surface 29 may be a part of a slot formed in the cylindrical surface of shaft 27 or may be any other line or surface configuration capable of actuating the plunger contact 16 of the signalling device 13.

A lever arm 30 is fixedly attached at one end to shaft 27 and is arranged to extend transversely from the shaft's longitudinal axis. As shown in FIG. 2 lever arm 30 is threadedly attached to shaft 27 although it is within the scope of this invention to form the shaft and lever arm structure in any manner and may be satisfactorily formed of one piece, if so desired. As shown in FIGS. 1–3 lever arm 30 protrudes out of an opening 31 in housing 23 and is provided with a line guiding curl 32 at its free end. Lever arm 30 is rotated in one direction which is counterclockwise as shown in FIG. 1 and clockwise as shown in FIGS. 2 and 3 to rotate shaft 27 and the cam surface 29 for actuating the switch contact 16 of the signalling device 13 to complete the electrical circuit through the electric lamp. A spring biasing means 33 is provided for controlling the movement of lever arm 30 in said one direction. In FIGS. 1-3 this biasing means is provided with a coil spring 35 fixedly attached at its inner end 36. The free end of spring 35 is arranged for engaging lever arm 30 and biasing it against movement in said one direction. The biasing effect of spring 35 may be varied by axial movement of bolt 34 inwardly or outwardly of housing 23. One end of shaft 27 may be provided with a line guiding curl 37.

As shown in FIG. 1 fishing line 12 is threaded from reel 11 through guiding curl 37 at the end of shaft 27, guiding curl 32 at the end of lever arm 30 and through the guides (not shown) arranged along the length of pole 10 to the fishing tackle arranged at the hook end of the line. Guiding curls 32 and 37 hold the line outwardly of the signalling device. When a fish strikes the hook end of the line, the line is jerked or pulled taut or straight resulting in rotating lever arm 30 counterclockwise, as shown in FIG. 1, against the biasing effect of spring 35. Rotation of lever arm 30 against the biasing effect of spring 35 causes cam surface 29 of shaft 27 to force plunger contact 16 inwardly to cause the battery terminal to engage the base of the electric lamp in the usual manner. This action completes the electric battery circuit through the metal casing 14 and the lamp which lights the lamp and indicates to the fisherman that the fish is hooked. Contact 16 of the signalling device is pressed inwardly to contact the lamp against the force of the battery spring (not shown) which normally holds the plunger contact 16 in open circuit position. As explained above the sensitiveness of the triggering lever arm 30 is adjusted or set by threadedly adjusting the position of bolt 34 in housing 23.

FIG. 5 illustrates a modification of the structure shown in FIGS. 1-4 wherein the aperture 31 in housing 23 is extended to the end of the housing and forms a slot 39. A sleeve 40 is slidably mounted around the outer surface of housing 23 and is provided with an aperture or indentation 41 therein. A compression spring 42 is fixedly attached at one end to lever arm 30 and at the other end to sleeve 40 for biasing the lever arm toward the sleeve. The biasing effect of spring 42 on lever arm 30 is determined by the particular position of sleeve 40 on housing 23. Sleeve 40 when positioned at a given place on housing 23 is retained there by the force of spring 42 which binds sleeve 30 to housing 23 by pulling sleeve 40 toward lever arm 30 at one point only along its outer periphery. This binding action is sufficient to retain sleeve 40 relatively fixed on housing 23 but at the same time makes it relatively simple for an operator to move the sleeve readily to another position to vary the sensitiveness of the signalling device.

FIG. 6 illustrates a variation of the structure shown in FIGS. 1-5 wherein a flash light casing 45 serves as the housing for supporting shaft 27 and a lever arm 38. Lever arm 38 is attached to shaft 27 in the same manner as disclosed for shaft 30 in FIGS. 1-5. Shaft 27 is rotatably mounted in apertures 46 which serve as bearings therefor. Except for these differences the signalling structure shown in FIG. 6 operates generally in the same manner as the structure shown in FIGS. 1-4. In place of the spring biasing means 33 of FIGS. 1-4 the structure shown in FIG. 6 utilizes sleeve 40 and spring 42 shown in FIG. 5 for the lever arm biasing means. Sleeve 40 is arranged to operate over and on the surface of the flash light casing 45 in the same manner as sleeve 40 operates over and on the housing 23 shown in FIG. 5.

FIG. 7 illustrates a modification of the structure shown in FIG. 5 wherein a hollow cylindrical housing 48 of the adaptor is similar to housing 23 except that the housing is open at end 49 thereof for receiving the curved end of a lever arm 50. Lever arm 50 is secured to shaft 27 in the same manner as lever arm 30. Sleeve 40 is slidably mounted on housing 48 in the same manner as sleeve 40 is mounted on housing 23 of FIG. 5 and is biased against contact actuation by spring 42.

FIG. 8 is a modification of the structure shown in FIG. 7 wherein sleeve 40 is omitted and spring 42 is fixedly attached as one end to housing 48 by a suitable screw or bolt 51 and fastened at the other end in one of a plurality of grooves 52 formed in lever arm 50 along its length. The sensitiveness of the adaptor is varied by moving the attachment of the spring end to one or another of the grooves in lever arm 50.

Although the signalling device has been shown and described as a flash light structure mounted on a fishing rod, it is intended to be within the scope of this invention to use any other form of a signalling device such as a buzzer or bell mounted on a pole or any other suitable structure.

Various modifications and changes in the precise construction and arrangement of the parts forming the invention are contemplated and may obviously be resorted to, and the right is therefore expressly reserved to make such modifications and changes as do not depart from the spirit and scope of the invention as hereinafter defined by the appended claim. It is understood that the parts of the claimed structure may be formed out of any type of material such as metal, plastic, or any combination thereof and the parts may be machined, molded or fabricated in any way and in any number of parts or combinations.

What is claimed is:

An adaptor for connecting a signal device having an actuating member extending from one end to a fishing line comprising a cylindrical housing, said housing having a first passageway extending axially therethrough, said first passageway at one end of said housing being enlarged, said housing having a transverse passageway extending therethrough and communicating with said first passageway, a shaft arranged to extend through the other end of said housing transversely to its longitudinal axis, the outline of said shaft being formed to provide an actuating member engaging portion within said transverse passageway, a lever arm fixedly attached at one end thereof to said shaft and arranged to extend transversely therefrom, the other end of said lever arm being actuatable in one direction to rotate said shaft, an adjustable tension means having one end attached to said lever arm and the other end anchored to said housing, and means for attaching the adaptor to the signal device whereby the signal device may be positioned in said enlarged end of said passageway with said actuating member being in contact with said shaft so that when the fish line is attached to said lever arm and pulled thereon causes rotation of said lever arm.

References Cited in the file of this patent
UNITED STATES PATENTS

| | | |
|---|---|---|
| 963,654 | Schindler | July 5, 1910 |
| 1,309,365 | Monighan | July 8, 1919 |
| 1,337,292 | Timmons | Apr. 20, 1920 |
| 2,490,669 | Burke | Dec. 6, 1949 |
| 2,619,559 | Schenkel | Nov. 25, 1952 |
| 2,744,351 | Smith | May 8, 1956 |
| 2,770,906 | Hood | Nov. 20, 1956 |
| 2,816,387 | Crowe et al. | Dec. 17, 1957 |
| 2,816,388 | Hartley | Dec. 17, 1957 |
| 2,930,158 | McQuiston | Mar. 29, 1960 |
| 2,973,599 | Olson | Mar. 7, 1961 |